US008711714B2

(12) United States Patent
Zhu et al.

(10) Patent No.: US 8,711,714 B2
(45) Date of Patent: Apr. 29, 2014

(54) METHOD AND SYSTEM FOR SIMULATING WIRELESS NETWORKS (75) Inventors: Chenxi Zhu, Gaithersburg, MD (US); Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1062 days.

(21) Appl. No.: 12/751,732

(22) Filed: Mar. 31, 2010

(65) Prior Publication Data

US 2011/0242996 A1    Oct. 6, 2011

(51) Int. Cl.
- *H04L 1/00* (2006.01)
- *H04L 12/26* (2006.01)
- *H04J 1/16* (2006.01)
- *H04J 3/14* (2006.01)

(52) U.S. Cl.
USPC .......................... 370/250; 370/241; 370/241.1

(58) Field of Classification Search
USPC .............. 370/241, 241.1, 250, 252, 351, 352, 370/389, 464
See application file for complete search history.

(56) References Cited

U.S. PATENT DOCUMENTS

2003/0087645 A1*   5/2003   Kim et al. ...................... 455/453

OTHER PUBLICATIONS

Tipper, David, "Fundamentals of Cellular Networks", Jun. 10, 2007, University of Pittsburgh, all pages.*
Helmut Bölcskei et al., Space-Frequency Coded Broadband OFDM Systems, Information Systems Laboratory, Stanford University (CA), *IEEE WCNC* 2000, Chicago (IL), Sep. 2000.
Gerard J. Foschini, Layered Space-Time Architecture for Wireless Communication in a Fading Environment when Using Multi-Element Antennas, © 1996 Lucent Technologies Inc., *Bell Labs Technical Journal*, Autumn 1996, Oct. 1996.
Ersin Sengul et al., *Diversity Analysis of Single and Multiple Beamforming*, The Henry Samueli School of Engineering, University of California, Irvine (CA), Jun. 2006.
Siavash M. Alamouti, A Simple Transmit Diversity Technique for Wireless Communications, *IEEE Journal on Select Areas in Communications*, vol. 16, No. 8, Oct. 1998.
Recommendation ITU-R M.1225, *Guidelines for Evaluation of Radio Transmission Technologies for IMT-2000* (Question ITU-R 398/8), Feb. 1997.
Report ITU-R M.2133, *Requirements, Evaluation, Criteria and Submission Templates for the Development of IMT-Advanced*, Dec. 2008.
Kyungkoo Jun, Packet QoS Aware AMC Selection for 3G LTE of Evolved Packet System, © 2008, *IEICE Trans. Commun.*, vol. E91-B, No. 8, Aug. 2008.

(Continued)

*Primary Examiner* — Kwang B Yao
*Assistant Examiner* — Adam Duda
(74) *Attorney, Agent, or Firm* — Baker Botts L.L.P.

(57) ABSTRACT

A method, that comprises selecting for simulation a first cell comprising a access station. The method also includes determining a first cell pattern comprising a first plurality of cells surrounding the first cell. The method additionally includes simulating, for each cell of the first plurality of cells, at least one wireless parameter associated with at least one wireless signal. The method further includes determining a second cell pattern comprising a second plurality of cells surrounding the first cell pattern. Each cell of the second plurality of cells comprises a copy of a simulation result of a corresponding cell of the first plurality of cells. The method also includes simulating, for the first cell, at least one wireless parameter associated with at least one wireless connection. The simulation is based on the simulation results of the first plurality of cells and the copied simulation results of the second plurality of cells.

21 Claims, 3 Drawing Sheets

(56) References Cited

OTHER PUBLICATIONS

3GPP TS 23.203 V8.4.0 (Dec. 2008), Technical Specification, 3rd Generation Partnership Project; Technical Specification Group Services and System Aspects; Policy and Charging Control Architecture (Release 8), © 2008, *3GPP Organization Partners*.

3GPP TS 25.814 V7.1.0 (Sep. 2006), Technical Report, 3rd Generation Partnership Project; Technical Specification Group Radio Access Network; Physical Layer Aspects for Evolved Universal Terrestrial Radio Access (UTRA) (Release 7), © 2006, *3GPP Organization Partners*.

3GPP TS 36.211 V8.6.0 (Mar. 2009), Technical Specification, 3rd Generation Partnership Project; Technical Specification Group Radio Access Network; Evolved Universal Terrestrial Radio Access (E-UTRA); Physical Channels and Modulation (Release 8), © 2009, *3GPP Organization Partners*.

3GPP TS 36.212 V8.6.0. (Mar. 2009), Technical Specification, 3rd Generation Partnership Project; Technical Specification Group Radio Access Network; Evolved Universal Terrestrial Radio Access (E-UTRA); Multiplexing and Channel Encoding (Release 8), © 2009, *3GPP Organization Partners*.

3GPP TS 36.213 V8.6.0 (Mar. 2009), Technical Specification, 3rd Generation Partnership Project; Technical Specification Group Radio Access Network; Evolved Universal Terrestrial Radio Access (E-UTRA); Physical Layer Procedures (Release 8), © 2009, *3GPP Organization Partners*.

WiMAX™ System Evaluation Methodology, Version 2.1, Jul. 7, 2008 *WiMAX Forum*, © 2007-2008 WiMAX Forum. Jul. 2008.

* cited by examiner

METHOD AND SYSTEM FOR SIMULATING WIRELESS NETWORKS

TECHNICAL FIELD

The present invention relates generally to wireless networks and more particularly to methods and systems for simulating wireless networks.

BACKGROUND

System level simulation is a common part of the design, evaluation and optimization of wireless networks, including Code Division Multiple Access (CDMA), Universal Mobile Telecommunications System (UMTS), Worldwide Interoperability for Microwave Access (WiMAX) and Third Generation Partnership Project Long Term Evolution (3GPP LTE) and any other wireless technology or protocol. During the design phase of the air interface, the system capacity and network coverage is often evaluated through detailed system level simulation. During the simulation the effect of different capacity enhancement techniques and interference management and reduction techniques (e.g., Multiple Input Multiple Output (MIMO), beamforming, Spatial Division Multiple Access (SDMA), power control, fractional frequency reuse, interference coordination and cancellation) may be evaluated.

Typically, the simulation involves a network divided into clusters containing nineteen hexagonal cells laid out in a hexagonal pattern. The analysis focuses on individual cells where the cell currently being simulated is at the center of a cluster of nineteen cells and is often referred to as the target cell. The analysis involves simulating two rings of cells around the target cell to assess the interference generated in those cells. For a wireless link, including both the uplink and downlink, the Signal to Interference-plus-Noise Ratio (SINR) of a transmission from transmitter i to receiver j is given as:

$$SINR_{i,j} = P_i \cdot |H_{i,j}|^2 \Big/ \Big[\sum_{k \neq i}(P_k \cdot |H_{k,j}|^2) + N_0\Big]$$

SUMMARY

The teachings of the present disclosure relate to a method comprising selecting a first cell for simulation. The first cell represents a first access station comprising a first interface configured to communicate wirelessly with at least one endpoint within the first cell. The method also includes determining a first cell pattern comprising a first plurality of cells surrounding the first cell. Each cell of the first plurality of cells comprises an access station. The method additionally includes simulating, for each cell of the first plurality of cells, at least one wireless parameter associated with at least one wireless signal. The method further includes determining a second cell pattern comprising a second plurality of cells surrounding the first cell pattern. Each cell of the second plurality of cells comprises a copy of a simulation result of a corresponding cell of the first plurality of cells. The method also includes simulating, for the first cell, at least one wireless parameter associated with at least one wireless connection, the simulation based on the simulation results of the first plurality of cells and the copied simulation results of the second plurality of cells.

Technical advantages of particular embodiments may include simulating a wireless network in which at least a portion of the cells surrounding a target cell are copies of other cells that have been simulated. This may decrease the computational load required to simulate a network without having a significant impact on the quality of the simulation results. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
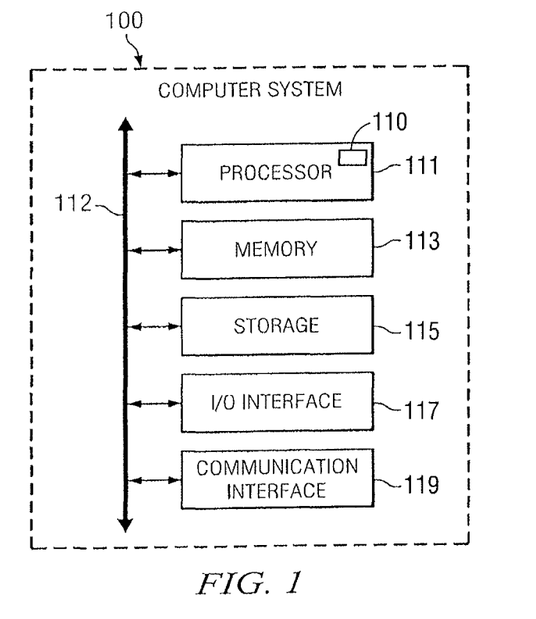
FIG. 1 illustrates a detailed block diagram of a system configured to simulate a wireless network, in accordance with particular embodiments.

FIG. 1 illustrates a detailed block diagram of a system configured to simulate a wireless network in accordance with particular embodiments. The simulated wireless network may comprise multiple networks utilizing any of a variety of wireless communication protocols, features, and/or technologies. The wireless network may comprise multiple access stations, base stations, relay stations, access points and/or any other component capable of establishing a wireless connection with an endpoint (generally referred to as an "access station"). The simulated components may use CDMA, UMTS, WiMAX, 3G, 3GPP LTE, 3GPP LTE-Advanced, MIMO, beamforming, SDMA, power control, fractional frequency reuse, interference coordination and cancellation, and/or any other technology, option, feature, and/or protocol. The simulated wireless network may be used to provide any of a variety of services including voice calls, video calls, internet access, online gaming, file sharing, peer-to-peer file sharing (P2P), voice over internet protocol (VoIP) calls, video over IP calls, or any other type of functionality that may be provided by a network.

The components of simulation system 100 may be used to simulate interference from outside of a respective target cell. In particular embodiments, this may involve a detailed transmission scheduling algorithm and a power control algorithm being implemented in simulating a reduced number of cells (as compared to the nineteen cells traditionally simulated). To simulate the reduced number of cells more realistically, particular embodiments may duplicate the simulation of the reduced number of cells and then de-correlate and/or distribute the duplicate cells around the reduced number of cells. This may allow the simulation system 100 to run simulations that take into account a large number of cells (e.g., thirty-seven) while only fully simulating a small portion of those cells (e.g., seven). This may allow for accurate simulation results without large computational complexity. Full simulation may involve simulating at least one parameter of at least one wireless connection associated with an access station within a particular target cell. Depending on the embodiment, the simulation of a target cell may comprise one or more of the instantaneous channel condition of connection to one or more endpoints, the selection of a particular endpoint, the MCS and transmission scheme used, the QoS of the user traffic flows, the ARQ/HARQ processes, or any other factor, feature, or parameter that may be desired.

Simulation system 100 may include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provides functionality described or illustrated herein.

The components of simulation system 100 may comprise any suitable physical form, configuration, number, type and/or layout of the components discussed with respect to simulation system 100.

As an example, and not by way of limitation, simulation system 100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these.

Where appropriate, simulation system 100 may include one or more computer systems; be unitary or distributed; span multiple locations; span multiple machines; or reside in a cloud, which may include one or more cloud components in one or more networks. Where appropriate, simulation system 100 may perform without substantial spatial or temporal limitation one or more steps of one or more methods described or illustrated herein. As an example, and not by way of limitation, simulation system 100 may perform in real time or in batch mode one or more steps of one or more methods described or illustrated herein. One or more simulation systems 100 may perform at different times or at different locations one or more steps of one or more methods described or illustrated herein, where appropriate.

In particular embodiments, simulation system 100 includes computer program 110, processor 111, memory 113, storage 115, input/output (I/O) interface 117, communication interface 119, and bus 112. These components may work together in order to simulate one or more wireless networks. Although a particular simulation system is depicted having a particular number of particular components in a particular arrangement, this disclosure contemplates any suitable simulation system 100 having any suitable number of any suitable components in any suitable arrangement.

In particular embodiments, processor 111 includes hardware for executing instructions, such as those making up computer program 110. Computer program 110 comprises instructions to perform one or more steps of one or more methods described or illustrated herein. As an example and not by way of limitation, to execute instructions, processor 111 may retrieve (or fetch) the instructions from an internal register, an internal cache, memory 113, or storage 115; decode and execute them; and then write one or more results to an internal register, an internal cache, memory 113, or storage 115. In particular embodiments, processor 111 may include one or more internal caches for data, instructions, or addresses. This disclosure contemplates processor 111 including any suitable number of any suitable internal caches, where appropriate. As an example and not by way of limitation, processor 111 may include one or more instruction caches, one or more data caches, and one or more translation lookaside buffers (TLBs). Instructions in the instruction caches may be copies of instructions in memory 113 or storage 115, and the instruction caches may speed up retrieval of those instructions by processor 111. Data in the data caches may be copies of data in memory 113 or storage 115 for instructions executing at processor 111 to operate on; the results of previous instructions executed at processor 111 for access by subsequent instructions executing at processor 111 or for writing to memory 113 or storage 115; or other suitable data. The data caches may speed up read or write operations by processor 111. The TLBs may speed up virtual-address translation for processor 111. In particular embodiments, processor 111 may include one or more internal registers for data, instructions, or addresses. Depending on the embodiment, processor 111 may include any suitable number of any suitable internal registers, where appropriate. Where appropriate, processor 111 may include one or more arithmetic logic units (ALUs); be a multi-core processor; include one or more processors 111; or any other suitable processor.

In particular embodiments, memory 113 may include main memory for storing instructions for processor 111 to execute or data for processor 111 to operate on. As an example and not by way of limitation, simulation system 100 may load instructions from storage 115 or another source (such as, for example, another computer system, another access station, or an endpoint) to memory 113. Processor 111 may then load the instructions from memory 113 to an internal register or internal cache. To execute the instructions, processor 111 may retrieve the instructions from the internal register or internal cache and decode them. During or after execution of the instructions, processor 111 may write one or more results (which may be intermediate or final results) to the internal register or internal cache. Processor 111 may then write one or more of those results to memory 113. In particular embodiments, processor 111 may execute only instructions in one or more internal registers or internal caches or in memory 113 (as opposed to storage 115 or elsewhere) and may operate only on data in one or more internal registers or internal caches or in memory 113 (as opposed to storage 115 or elsewhere). One or more memory buses (which may each include an address bus and a data bus) may couple processor 111 to memory 113. Bus 112 may include one or more memory buses, as described below. In particular embodiments, one or more memory management units (MMUs) may reside between processor 111 and memory 113 and facilitate accesses to memory 113 requested by processor 111. In particular embodiments, memory 113 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 113 may include one or more memories 113, where appropriate.

In particular embodiments, storage 115 may include mass storage for data or instructions. As an example and not by way of limitation, storage 115 may include an HDD, a floppy disk drive, flash memory, an optical disc, a magneto-optical disc, magnetic tape, or a Universal Serial Bus (USB) drive or a combination of two or more of these. Storage 115 may include removable or non-removable (or fixed) media, where appropriate. Storage 115 may be internal or external to access station 210, where appropriate. In particular embodiments, storage 115 may be non-volatile, solid-state memory. In particular embodiments, storage 115 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Mass storage 115 may take any suitable physical form and may comprise any suitable number or type of storage. Storage 115 may include one or more storage control units facilitating communication between processor 111 and storage 115, where appropriate.

In particular embodiments, I/O interface 117 may include hardware, encoded software, or both providing one or more interfaces for communication between simulation system 100 and one or more I/O devices. Simulation system 100 may include one or more of these I/O devices, where appropriate. One or more of these I/O devices may enable communication between a person and simulation system 100. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of I/O interfaces 117 for them. Where appropriate, I/O interface 117 may include one or more device or encoded software drivers enabling processor 111 to drive one or more of these I/O devices. I/O interface 117 may include one or more I/O interfaces 117, where appropriate.

In particular embodiments, communication interface 119 may include hardware, encoded software, or both providing one or more interfaces for communication (such as, for example, packet-based communication) between simulation system 100 and one or more other computer systems. As an example and not by way of limitation, communication interface 119 may include a network interface controller (NIC) or network adapter for communicating with an Ethernet or other wire-based network or a wireless NIC (WNIC) or wireless adapter for communicating with a wireless network. Depending on the embodiment, simulation system 100 may be used in any suitable network and may comprise any suitable communication interface 119 for it. As an example and not by way of limitation, simulation system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, simulation system 100 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Simulation system 100 may include any suitable communication interface 119 for any of these networks, where appropriate. Communication interface 119 may include one or more communication interfaces, where appropriate.

In particular embodiments, bus 112 may include hardware, encoded software, or both coupling components of simulation system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 112 may include any number, type, and/or configuration of buses 112, where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 111 (such as, for example, one or more internal registers or caches), one or more portions of memory 113, one or more portions of storage 115, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The components and devices illustrated in FIG. 1 may be used to simulate one or more features and/or components of a wireless network. In simulating a wireless network, particular embodiments may provide simulations with enough detail to provide realistic results. The accurate simulation of uplink (from the endpoint to the access station) and/or downlink (from the access station to the endpoint) transmissions may be done while keeping the computational complexity relatively low. Particular embodiments may achieve these goals by fully simulating a reduced number of cells within a cluster. The simulated cells may then be duplicated, de-correlated and/or redistributed around the reduced number of cells that were fully simulated.

Figure 2:
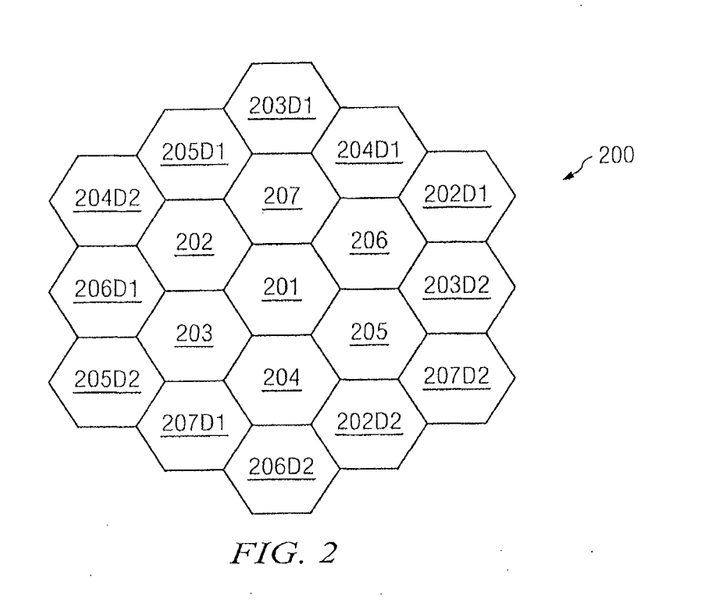
FIG. 2 illustrates a nineteen-cell cluster, in accordance with a particular embodiment.
Figure 3:
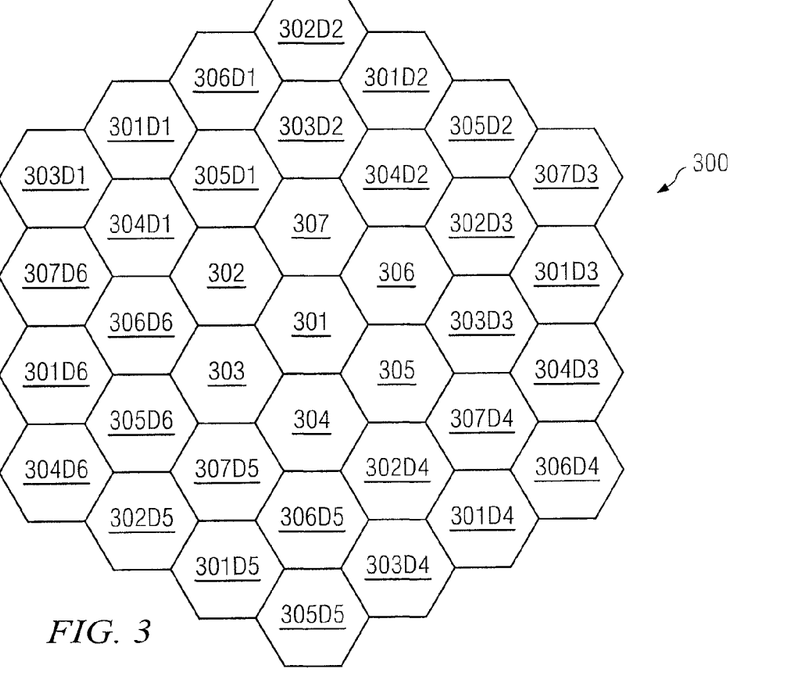
FIG. 3 illustrates a thirty-seven-cell cluster, in accordance with a particular embodiment.
Figure 4:
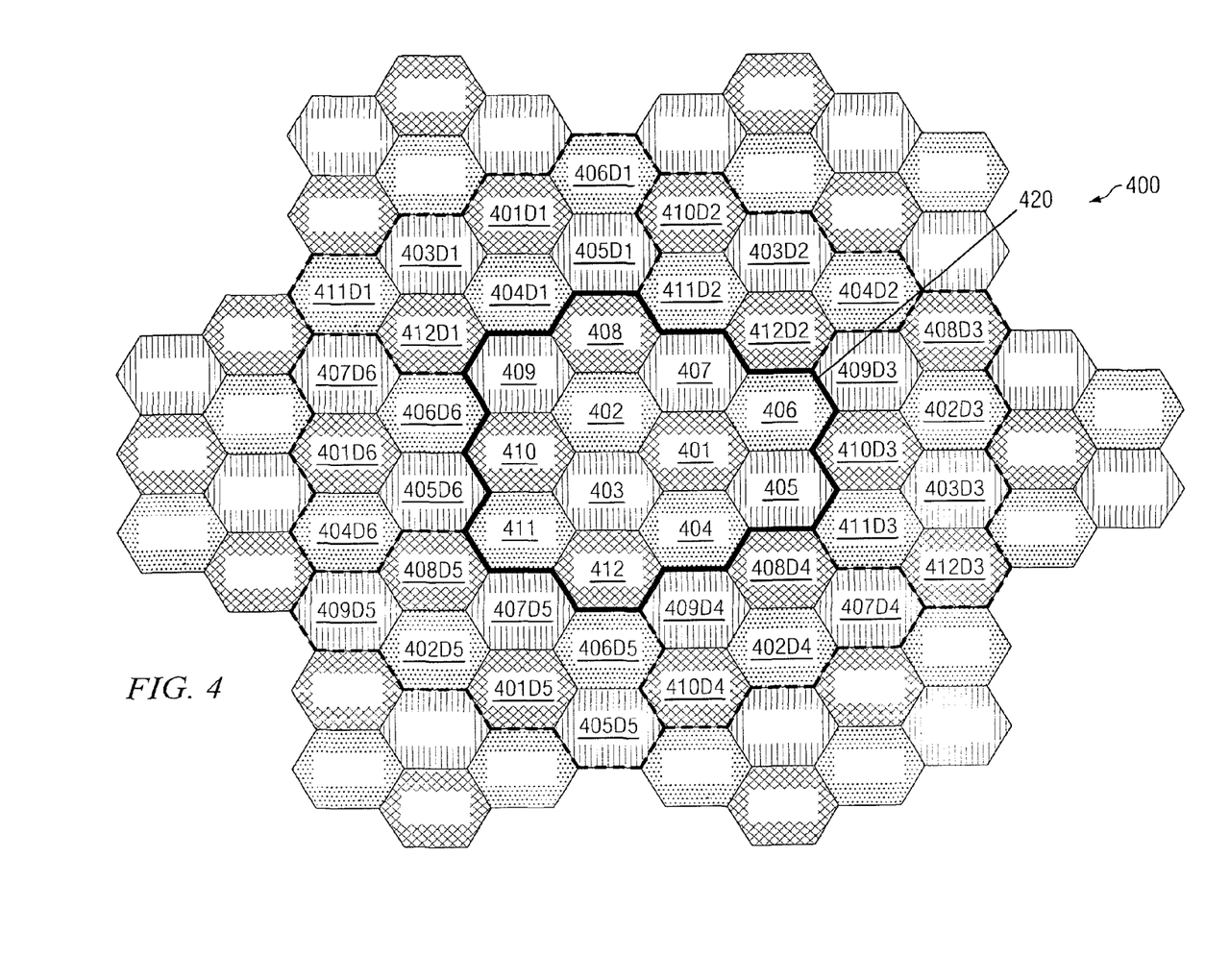
FIG. 4 illustrates a twelve-cell cluster, in accordance with a particular embodiment.

Depending on the embodiment, the various cell layouts depicted and described herein in FIGS. 2-4 may comprise repetition patterns that may be applied to uplink simulation as well as downlink simulation. In downlink simulation, particular embodiments may perform detailed simulation of multiple cells. For example, when neighbor cells do not operate independently, but need to coordinate their transmissions. An example of this is coordinated multi-point transmission or distributed MIMO. In uplink simulation, particular embodiments may use the cell layout pattern to simulate joint reception at multiple access stations.

Thus far, several different embodiments and features have been presented. Particular embodiments may combine one or more of these features depending on operational needs and/or component limitations. This may allow for great adaptability of simulation system 100 to the needs of various organizations and users. For example, a particular embodiment may use multiple computers which distribute the computational load during a simulation. Some embodiments may include additional features.

FIG. 2 illustrates a nineteen-cell cluster, in accordance with a particular embodiment. Cluster 200 comprises target cell 201 surrounded by an inner ring, formed by cells 202-207, which is surrounded by an outer ring, formed by cells 202D1-207D2. In particular embodiments, target cell 201 and the inner ring of cells, cells 202-207 may be simulated in full detail while the cells in the outer ring, duplicate cells 202D1-207D2 may replicate the simulations of cells 202-207. Interference coming from cells beyond these two rings of neighboring cells are much weaker and, in particular embodiments may be ignored.

The simulations may determine transmission patterns (e.g., position of an endpoint within a cell, the transmission power of the endpoint, and MIMO precoding/beamforming matrix, CDMA code when applicable). By only simulating seven of the nineteen cells, particular embodiments may reduce the computational load involved in simulating the wireless network. Moreover, by including the duplicate cells, the simulation of target cell 201 may be more accurate than only using cells 202-207 surrounding target cell 201.

In particular embodiments, replicating cells 202-207 to produce duplicate cells 202D1-207D2 may comprise de-correlating the duplicate cells. For example, duplicate cells 202D1-207D2 may comprise a time shift from cells 202-207. As another example, replicating cells 202-207 may comprise rotating cells 202-207 by a certain number of degrees (e.g., 120, or 240) to produce duplicate cells 202D1-207D2. In certain situations, each duplicate of a particular cell may be time shifted or rotated by a different amount.

Although, in the depicted embodiment, the same cell (e.g., cell 204) is duplicated multiple times (e.g., duplicate cells 204D1 and 204D2), each of these cells, the duplicate cells and the corresponding original cell, are two cells apart. Moreover, particular embodiments may time delay the transmissions or rotate the cell orientation to further reduce the correlations of transmission in different duplicate cells. These techniques may reduce or eliminate inaccuracies in the simulation results that may have been caused by the duplicated cell.

In the depicted embodiment, cells 201-207, the cells which are simulated in full detail, are surrounded by cells with different transmission patterns. For example, cell 201 is surrounded by cells 202-207. As another example, cell 202 is surrounded by cells 201, 203, and 207 and duplicate cells 206D1 (duplicate of cell 206), 204D2 (duplicate of cell 204), and 205D2 (duplicate of cell 205). This may increase the accuracy and fidelity of the simulation results.

FIG. 3 illustrates a thirty-seven-cell cluster, in accordance with a particular embodiment. Similar to the embodiment depicted in FIG. 2, cluster 300 only simulates in full detail the uplink and downlink transmission in seven cells; target cell 301 and the six cells, cells 302-307, surrounding target cell 301. Compared to cluster 200, cluster 300 includes an additional ring of duplicate cells to bring the total number of cells to thirty-seven. The two rings of duplicate cells, duplicate cells 301D1-307D6, comprise duplicates of cells 301-307. In particular embodiments, the duplicate cells may be arranged, relative to one another, to match the arrangement of cells 301-307. For example, duplicate cell 301D1 may be a duplicate of cell 301, and the for cells around duplicate cell 301D1 may comprise, in clockwise order, duplicate cells 306D1, 305D1, 304D1, and 303D1. These duplicates cells are in the same order or arrangement as cells 303-306 around cell 301. In particular embodiments, the arrangement of cells in cluster 300 may such that it may be repeated indefinitely to extend the cell layout beyond thirty-seven cells. In certain embodiments, the cells of cluster 300 may be arranged such that the six immediate neighbors of each cell are all distinct.

In particular embodiments, the accuracy of the simulation may be increased by performing de-correlation when replicating cells 301-307. Similar techniques may be used as those discussed above with respect to FIG. 2. In certain embodiments, different duplicate cells may be de-correlated in a different way. For example, different sub-groupings within duplicate cells 301D1-307D6 may be time shifted different amounts of time, or may be rotated a different number of degrees. In some embodiments, duplicate cells 301D1-307D6 may comprise a mixture of different shift times and different rotational amounts.

Cellular networks are typically interference limited, so the users near the cell edge are mainly constrained by the interference produced by other users in other cells. This may be true both for the uplink and the downlink connection between the access station and the endpoint. In particular embodiments, the simulation of each cell 301-307 may include interference generated by two rings of surrounding cells. This may produce simulation results with very high fidelity which may satisfy the usual simulation fidelity requirements of a cellular network.

FIG. 4 illustrates a twelve-cell cluster, in accordance with a particular embodiment. Cluster 420 of simulated network 400 may be used in scenarios in which it is desired to simulate frequency reuse schemes. For example, a fractional frequency reuse scheme divides the coverage area into a cell center area and a cell edge area. Within the cell center area the entire frequency bandwidth is used, while within the cell edge area a fraction of the entire frequency bandwidth is used. In the depicted embodiment, simulated network 400 uses a scheme that divides the entire bandwidth into three orthogonal sub-bands. Thus, each cell of simulated network 400 uses the entire bandwidth in its cell center and one of the three sub-bands in its cell outer region. In particular embodiments, the cells of cluster 420 may be arranged such that a particular cell using a particular sub-band in its outer cell edge area is not directly bordered by any cells that also use the same sub-band in their respective cell outer region. This additional constraint may not be met by the cluster arrangements depicted in FIGS. 2-3 discussed above.

Cluster 420 provides a cell layout and repetition pattern that may support fractional frequency reuse. In this embodiment, cluster 420 consists of twelve cells 401-412. The arranged of cells 401-412 may represent the minimum number of cells that can be arranged in a pattern that can be repeated indefinitely in the 2D plane. Cluster 420 may be repeated to create a layout of arbitrary size in which the cell neighbor constraint discussed above is carried over faithfully with the repetition, including at the boundary of clusters.

In particular embodiments, cells 401-412 are simulated in full detail and then duplicate cells 401D1-407D6 may be generated by repetition of cluster 420 (de-correlation schemes may be applied as before in these duplicate cells 401D1-407D6). The thirty-six duplicate cells 401D1-407D6 represent the cells considered to satisfy the condition that cells simulated in full detail (cells 401-412) are surrounded by two rings of cells. This may provide the simulation of cells 401-412 with relatively realistic interference from neighboring cells.

The cell layout and repetition patterns depicted in FIGS. 2-4 may be used in downlink as well as uplink simulations. Moreover, in some embodiments, coordinated multi-point, which employ distributed transmission and joint reception techniques, may be studied using these cell layout schemes.

Figure 5:
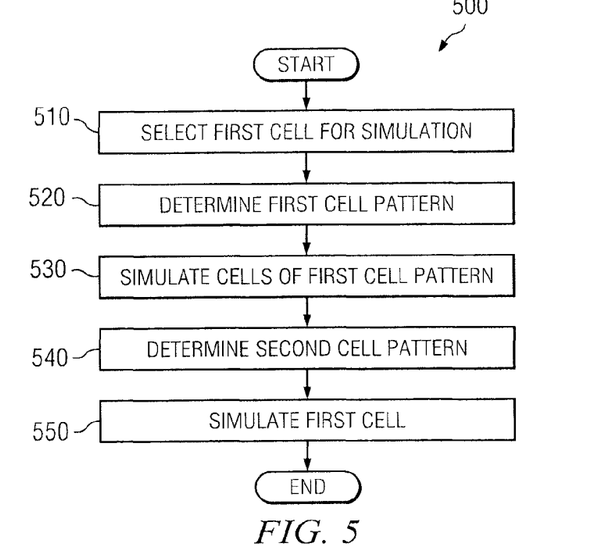
FIG. 5 illustrates a method for simulating a wireless network, in accordance with a particular embodiment.

FIG. 5 illustrates a method for simulating a wireless network, in accordance with a particular embodiment. The depicted method may be applicable in simulating a wide range of wireless networks and one or more features or components that may be implemented therein. The method begins with step 510 in which a first cell is selected for simulation. The selected first cell may be referred to as a target cell. The first cell may be selected in order to determine and/or assess, through simulation, one or more parameters of one or more wireless connections of an access station associated with the first cell. In order to increase the accuracy of the simulation, particular embodiments may take into account the impact of neighboring access stations in neighboring cells. This may allow the simulation to account for such factors as interference that may be caused by neighboring wireless signals.

At step 520 a first cell pattern is determined. The determined first cell pattern may include a plurality of cells that surround the first cell. This may ensure that the simulation of the first cell includes at least one ring of neighbors. The arrangement of cells in the first cell pattern may be dependent on the type and/or features of the wireless network to be simulated. For example, where the simulated wireless network comprises access stations that use the entire frequency bandwidth, the first cell pattern may comprise six cells that surround the first cell, as illustrated in FIG. 2 (cells 201-207) and FIG. 3 (cells 301-307). In particular embodiments, this arrangement is based on each cell having a hexagonal shape. Some embodiments may use cells having a different shape comprising more or less sides than a hexagon. This may change the number of cells used to surround the first cell.

In certain embodiments, it may be necessary to include additional factors other than ensuring that the first cell is surrounded by a ring of neighboring cells. For example, in embodiments in which the simulated network uses fractional frequency reuse, the first cell pattern may need to account for the number of frequency sub-bands that are to be used by the access stations. For example, in FIG. 4, the depicted embodiment comprises a first cell pattern having twelve cells. This first cell pattern ensures that the target cell is surrounded by a ring of neighboring cells that all use a frequency sub-band different than the frequency sub-band used by the first cell. In situations in which more or less frequency sub-bands are to be used, the first cell pattern may be adjusted accordingly.

At step 530 the cells of the first cell pattern are simulated. The simulation may be a full simulation that includes such factors as potential interference from neighboring cells. Depending on the embodiment and the desired accuracy of the simulation, each cell surrounding the target cell may itself be surrounded by one (e.g., FIG. 2), two (e.g., FIG. 3), or more rings of neighboring cells. Adding additional cells to the simulation may increase the accuracy of the results while also increasing computational load of the simulation.

At step 540 a second cell pattern is determined. The second cell pattern comprises multiple cells surrounding the first cell pattern. As with the first cell pattern, the number of cells and their arrangement may be based, in part, on the shape of the cells and/or the features or components of the simulated wireless network. It may also be based on the desired level of accuracy and/or the desired computational load. For example, in FIG. 2, the second pattern comprises twelve duplicate cells; in FIG. 3, the second pattern comprises thirty duplicate cells; and in FIG. 4 the second pattern comprises thirty-six duplicate cells. As the number of cells increase so to does the accuracy of the simulation and the computational load (increases may not be directly proportional).

For example, in an embodiment in which FRR is to be used during the simulation, determining the second cell pattern may comprise duplicating and spatially shifting the entire first cell pattern to surround the first cell pattern. This may ensure that no node is bordered by another node using the same frequency sub-band. In particular scenarios, simply duplicating and shifting the first cell pattern may result in a second cell pattern that includes a large number of cells. Accordingly, particular embodiments may limit the second cell pattern to a portion of the duplicated cells. For example, in the embodiment depicted in FIG. 4, the second cell pattern is limited to two rings of cells surrounding the first cell pattern.

The cells used in the second cell pattern may comprise duplicates of one or more of the cells of the first cell pattern. In replicating the cells of the first cell pattern to be used in the second cell pattern, particular embodiments may apply some form of de-correlation to decrease the similarities or correlation between duplicate cells, thereby improving the accuracy of the simulation. In particular embodiments, the de-correlation may comprise a time delay applied to the cells of the first cell pattern, a rotation of the cells of the first cell pattern, or any other technique, or combination of techniques, that may involve a computationally simple manipulation of the cells of the first cell pattern. In particular embodiments, the same technique may be applied multiple times. For example, if a particular cell is to be duplicated twice, the first time it is duplicated it may be rotated 120 degrees and the second time it is duplicated it may be rotated 240 degrees.

At step 550 the first cell is simulated. The simulation of the first cell may take into account the simulated results of the cells in the first cell pattern, as well as the duplicated results arranged in the second cell pattern. This may provide an accurate simulation without having to perform a full simulation on a large number of cells. For example, in the embodiment depicted in FIG. 2 only seven cells are fully simulated while the simulation of the target cell includes nineteen cells; in the embodiment depicted in FIG. 3 only seven cells are fully simulated while thirty-seven are used in the simulation in which each of the seven fully simulated cells accounts for the impact of two surrounding rings of cells; and in the embodiment depicted in FIG. 4 while only twelve cells are simulated, forty-eight cells are used in the simulation in which each of the twelve fully simulated cells accounts for the impact of two rings of neighboring cells.

Some of the steps illustrated in FIG. 5 may be combined, modified, re-ordered or deleted where appropriate, and additional steps may also be added to the flowchart without departing from the scope of particular embodiments. For example, in particular embodiments, the second cell pattern may be determined prior to simulating the cells of the first cell pattern. Then, once the cells of the first cell pattern have been simulated, the results may be associated with the appropriate duplicate cells.

Although particular embodiments have been described in detail, it should be understood that they do not limit the scope of this disclosure and that various other changes, substitutions, combinations and alterations may be made hereto without departing from the spirit and scope of the disclosure. For example, although an embodiment has been described with reference to a number of elements included within simulation system 100 such as processor 102 and storage 106, the elements of particular embodiments may be combined, rearranged or positioned in order to accommodate particular simulation needs. In addition, any of these elements may be provided as separate external components to simulation system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that various embodiments encompass all such changes, substitutions, variations, alterations and modifications as falling within the spirit and scope of the appended claims.

What is claimed:

1. A method, comprising, by one or more simulation systems:
   selecting a first cell for simulation, the first cell representing a first access station comprising a first interface configured to communicate wirelessly with at least one endpoint within the first cell;
   determining a first cell transmission repetition pattern comprising a first plurality of cells surrounding the first cell, each cell of the first plurality of cells comprising an access station;
   simulating, for each cell of the first plurality of cells, at least one wireless parameter associated with at least one wireless signal;
   determining a second cell transmission repetition pattern comprising a second plurality of cells surrounding the first cell transmission repetition pattern, each cell of the second plurality of cells comprising a copy of a simulation result of a corresponding cell of the first plurality of cells; and
   simulating, for the first cell, at least one wireless parameter associated with at least one wireless connection, the simulation based on the simulation results of the first plurality of cells and the copied simulation results of the second plurality of cells.

2. The method of claim 1, wherein the first cell transmission repetition pattern comprises at least six cells surrounding the first cell, the at least six cells arranged in a ring comprising an inner border that is shared with the first cell.

3. The method of claim 1, wherein the second cell transmission repetition pattern comprises at least twelve cells surrounding the first plurality of cells, the at least twelve cells arranged in a ring comprising an inner border that is shared with the first plurality of cells.

4. The method of claim 1, wherein the second cell transmission repetition pattern comprises at least thirty cells surrounding the first plurality of cells, the at least thirty cells arranged in two rings, an inner ring and an outer ring, the inner ring comprising an inner border shared with the first plurality of cells and an outer border shard with the outer ring.

5. The method of claim 1, wherein:
   the first cell transmission repetition pattern comprises the first plurality of cells and the first cell;
   determining a first cell transmission repetition pattern comprises:
      assigning one of at least two frequency sub-bands to each cell of the first cell transmission repetition pattern such that each of the at least two frequency sub-bands is assigned to an equal number of cells; and
      arranging the first number of cells and the first cell such that a border of each cell is shared with cells having different frequency sub-bands assigned thereto; and
   determining a second cell transmission repetition pattern comprises:
      creating a plurality of copies of the first cell transmission repetition pattern; and
      arranging the plurality of copies of the first cell transmission repetition pattern around the first cell transmission repetition pattern such that each cell of the first cell transmission repetition pattern and each cell of the second cell transmission repetition pattern comprises a border that is shared with cells having different frequency sub-bands.

6. The method of claim 1, wherein the copy of a simulation result of a corresponding cell of the first plurality of cells comprises a time delayed copy of a simulation result of a corresponding cell of the first plurality of cells.

7. The method of claim 1, wherein the copy of a simulation result of a corresponding cell of the first plurality of cells comprises a rotated copy of a simulation result of a corresponding cell of the first plurality of cells.

8. One or more computer-readable non-transitory storage media embodying software that when executed is operable to:
   select a first cell for simulation, the first cell representing a first access station comprising a first interface configured to communicate wirelessly with at least one endpoint within the first cell;
   determine a first cell transmission repetition pattern comprising a first plurality of cells surrounding the first cell, each cell of the first plurality of cells comprising an access station;
   simulate, for each cell of the first plurality of cells, at least one wireless parameter associated with at least one wireless signal;
   determine a second cell transmission repetition pattern comprising a second plurality of cells surrounding the first cell transmission repetition pattern, each cell of the second plurality of cells comprising a copy of a simulation result of a corresponding cell of the first plurality of cells; and
   simulate, for the first cell, at least one wireless parameter associated with at least one wireless connection, the simulation based on the simulation results of the first plurality of cells and the copied simulation results of the second plurality of cells.

9. The medium of claim 8, wherein the first cell transmission repetition pattern comprises at least six cells surrounding the first cell, the at least six cells arranged in a ring comprising an inner border that is shared with the first cell.

10. The medium of claim 8, wherein the second cell transmission repetition pattern comprises at least twelve cells surrounding the first plurality of cells, the at least twelve cells arranged in a ring comprising an inner border that is shared with the first plurality of cells.

11. The medium of claim 8, wherein the second cell transmission repetition pattern comprises at least thirty cells surrounding the first plurality of cells, the at least thirty cells arranged in two rings, an inner ring and an outer ring, the inner ring comprising an inner border shared with the first plurality of cells and an outer border shard with the outer ring.

12. The medium of claim 8, wherein:
the first cell transmission repetition pattern comprises the first plurality of cells and the first cell;
the executable instructions configured to determine a first cell transmission repetition pattern are further configured to:
assign one of at least two frequency sub-bands to each cell of the first cell transmission repetition pattern such that each of the at least two frequency sub-bands is assigned to an equal number of cells; and
arrange the first number of cells and the first cell such that a border of each cell is shared with cells having different frequency sub-bands assigned thereto; and
the executable instructions configured to determine a second cell transmission repetition pattern is further configured to:
create a plurality of copies of the first cell transmission repetition pattern; and
arrange the plurality of copies of the first cell transmission repetition pattern around the first cell transmission repetition pattern such that each cell of the first cell transmission repetition pattern and each cell of the second cell transmission repetition pattern comprises a border that is shared with cells having different frequency sub-bands.

13. The medium of claim 8, wherein the copy of a simulation result of a corresponding cell of the first plurality of cells comprises a time delayed copy of a simulation result of a corresponding cell of the first plurality of cells.

14. The medium of claim 8, wherein the copy of a simulation result of a corresponding cell of the first plurality of cells comprises a rotated copy of a simulation result of a corresponding cell of the first plurality of cells.

15. A system, comprising:
a processor configured to select a first cell for simulation, the first cell representing a first access station comprising a first interface configured to communicate wirelessly with at least one endpoint within the first cell; and
a storage device coupled to the processor and configured to store a first cell transmission repetition pattern comprising a first plurality of cells surrounding the first cell, each cell of the first plurality of cells comprising an access station;
wherein:
the processor further configured to simulate, for each cell of the first plurality of cells, at least one wireless parameter associated with at least one wireless signal;
the storage device further configured to store a second cell transmission repetition pattern comprising a second plurality of cells surrounding the first cell transmission repetition pattern, each cell of the second plurality of cells comprising a copy of a simulation result of a corresponding cell of the first plurality of cells; and
the processor is further configured to simulate, for the first cell, at least one wireless parameter associated with at least one wireless connection, the simulation based on the simulation results of the first plurality of cells and the copied simulation results of the second plurality of cells.

16. The system of claim 15, wherein the first cell transmission repetition pattern comprises at least six cells surrounding the first cell, the at least six cells arranged in a ring comprising an inner border that is shared with the first cell.

17. The system of claim 15, wherein the second cell transmission repetition pattern comprises at least twelve cells surrounding the first plurality of cells, the at least twelve cells arranged in a ring comprising an inner border that is shared with the first plurality of cells.

18. The system of claim 15, wherein the second cell transmission repetition pattern comprises at least thirty cells surrounding the first plurality of cells, the at least thirty cells arranged in two rings, an inner ring and an outer ring, the inner ring comprising an inner border shared with the first plurality of cells and an outer border shard with the outer ring.

19. The system of claim 15, wherein:
the first cell transmission repetition pattern comprises the first plurality of cells and the first cell;
the processor configured to determine a first cell transmission repetition pattern is further configured to:
assign one of at least two frequency sub-bands to each cell of the first cell transmission repetition pattern such that each of the at least two frequency sub-bands is assigned to an equal number of cells; and
arrange the first number of cells and the first cell such that a border of each cell is shared with cells having different frequency sub-bands assigned thereto; and
the processor configured to determine a second cell transmission repetition pattern is further configured to:
create a plurality of copies of the first cell transmission repetition pattern; and
arrange the plurality of copies of the first cell transmission repetition pattern around the first cell transmission repetition pattern such that each cell of the first cell transmission repetition pattern and each cell of the second cell transmission repetition pattern comprises a border that is shared with cells having different frequency sub-bands.

20. The system of claim 15, wherein the copy of a simulation result of a corresponding cell of the first plurality of cells may comprise a time delayed copy of a simulation result of a corresponding cell of the first plurality of cells.

21. The system of claim 15, wherein the copy of a simulation result of a corresponding cell of the first plurality of cells may comprise a rotated copy of a simulation result of a corresponding cell of the first plurality of cells.

* * * * *